(12) United States Patent
Fifield et al.

(10) Patent No.: US 7,505,991 B2
(45) Date of Patent: Mar. 17, 2009

(54) SEMANTIC MODEL DEVELOPMENT AND DEPLOYMENT

(75) Inventors: Davin J. Fifield, Redmond, WA (US); Edmund K. Baker, Bothell, WA (US); Larry J. Andersen, Duvall, WA (US); Marcos Calderon Macias, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 11/197,141

(22) Filed: Aug. 4, 2005

(65) Prior Publication Data
US 2007/0033212 A1    Feb. 8, 2007

(51) Int. Cl.
*G06F 17/30* (2006.01)

(52) U.S. Cl. .................. 707/102; 707/103 R; 707/101; 707/200

(58) Field of Classification Search .................. None
See application file for complete search history.

(56) References Cited

U.S. PATENT DOCUMENTS

2006/0069717 A1 *   3/2006   Mamou et al. .............. 709/203

\* cited by examiner

*Primary Examiner*—Cam Y T Truong
(74) *Attorney, Agent, or Firm*—John D. Veldhuis-Kroeze; Westman, Champlin & Kelly, P.A.

(57) ABSTRACT

A method of deploying a business application and generating a business intelligence semantic model corresponding to the business application comprises retrieving application metadata. The method also comprises deploying the business application using the application metadata to write a definition of the business application to an application database. The method also comprises automatically generating the business intelligence semantic model using the application metadata.

8 Claims, 7 Drawing Sheets

CREATE THE APPLICATION METADATA, USING AN APPLICATION DEPLOYMENT ENVIRNOMENT, SUCH THAT IT INCLUDES METADATA FOR DEPLOYING THE BUSINESS APPLICATION AND METADATA FOR GENERATING THE BUSINESS APPLICATION ⟋405

FIG. 10

CONTROL CONTENT OF THE SEMANTIC MODEL BY SETTING PROPERTIES OF APPLICATION OBJECT TREE TO CONTROL WHICH TABLES AND FIELDS ARE TO BE SHOWN WHEN A USER INTERACTS WITH THE BUSINESS INTELLIGENCE SEMANTIC MODEL ⟋405-1

FIG. 11

INCLUDE CURRENCY FIELD TRANSLATING LOGIC IN METADATA SUCH THAT, IN THE GENERATED BUSINESS INTELLIGENCE SEMANTIC MODEL, CURRENCY VALUES IN DIFFERENT CURRENCIES ARE AUTOMATICALLY CONVERTED TO A SINGLE CURRENCY ⟋405-2

FIG. 12

SEMANTIC MODEL DEVELOPMENT AND DEPLOYMENT

BACKGROUND

The discussion below is merely provided for general background information and is not intended to be used as an aid in determining the scope of the claimed subject matter.

Enterprise resource planning (or ERP) is a phrase used to describe a broad set of activities supported by multi-module application software that helps a manufacturer or other business manage the important parts of its business, including product planning, parts purchasing, maintaining inventories, order tracking, interacting with suppliers, providing customer service, finance, human resources, etc. An example of an ERP system is Microsoft® Business Solutions-Axapta®. Axapta provides functionality to support many needs of a business, for example including: manufacturing; distribution, supply chain management, project management, financial management, human resource management, business analysis, enterprise portal, commerce gateway, etc.

Frequently, in business applications such as ERP systems, complicated data schema are used to store the application metadata. The metadata could include, for example, tables and fields containing information relating to customer sales orders, information relating to inventory, etc. Separate business intelligence metadata, in the form of a "semantic model" is also created. The semantic model contains data such as information concerning the relationships between the stored application metadata, information about how the stored application metadata is analyzed (e.g., does it make sense to aggregate the application metadata by rolling up many transactions all related to the same customer, does it make sense to group on certain types of fields like phone number, etc.), and information about how to navigate the data. Other information can also be stored in the semantic model. The semantic model in effect places a layer on top of the business application metadata so that it can be properly understood, navigated, analyzed, etc. For example, it wouldn't be beneficial to aggregate on phone numbers when doing an analysis of business application metadata, so a semantic model might include some knowledge or information to indicate that fact. Semantic models also refer to items using "friendly names" rather than by their possibly cryptic and/or hard to understand real names.

Typically, in business applications, the creation of business intelligence metadata is accomplished "after the fact", frequently involving a completely different infrastructure. That is, after the business application database has been designed, a separate effort is undertaken to create an additional set of metadata that describes a "user friendly" business model on that same schema. Often times this semantic model is created by one or more persons other than the developers of the business application, thus potentially losing the benefit of the expertise of the developer(s) in the particular business area. It is this latter "semantic model" that users interact with when performing business intelligence scenarios: performing ad-hoc queries against the data stored in the relational database, or conducting analysis against an OLAP (Online Analytical Processing) database that has been created for that purpose.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed embodiments include methods, apparatus and systems which automatically generate a business intelligence semantic model upon deployment of a business application, for example an application in an enterprise resource planning (ERP) system. Using the disclosed embodiments, business application developers can generate a semantic model from the application development process, as opposed to generating it as a second development effort after deployment of the application.

BRIEF DESCRIPTION OF THE DRAWINGS

FIG. 7-14 are flow diagrams illustrating method embodiments.

DETAILED DESCRIPTION

Disclosed embodiments include methods, apparatus and systems which automatically generate a business intelligence semantic model upon deployment and/or modification of a business application, for example an application in an enterprise resource planning (ERP) system. Using the disclosed embodiments, business application developers can generate a semantic model from the application development process, as opposed to generating it as a second development effort after deployment of the application. Using disclosed embodiments, developers can automatically generate the semantic model corresponding to the business application by setting certain properties on tables and fields they define as they develop the application, many of which they would typically set anyway. By integrating these capabilities into the primary application development and deployment process, developers get the added benefit of testing both the regular application and the business intelligence behavior as they go through the development cycle, instead of adding business intelligence capabilities only once the application definition is completed. This potentially increases the quality and decreases the time-to-market for their overall solution. They also get the benefit of the business application development environment's innate knowledge of the application to improve the overall quality and relevance of the semantic model that is automatically created.

Figure 1:
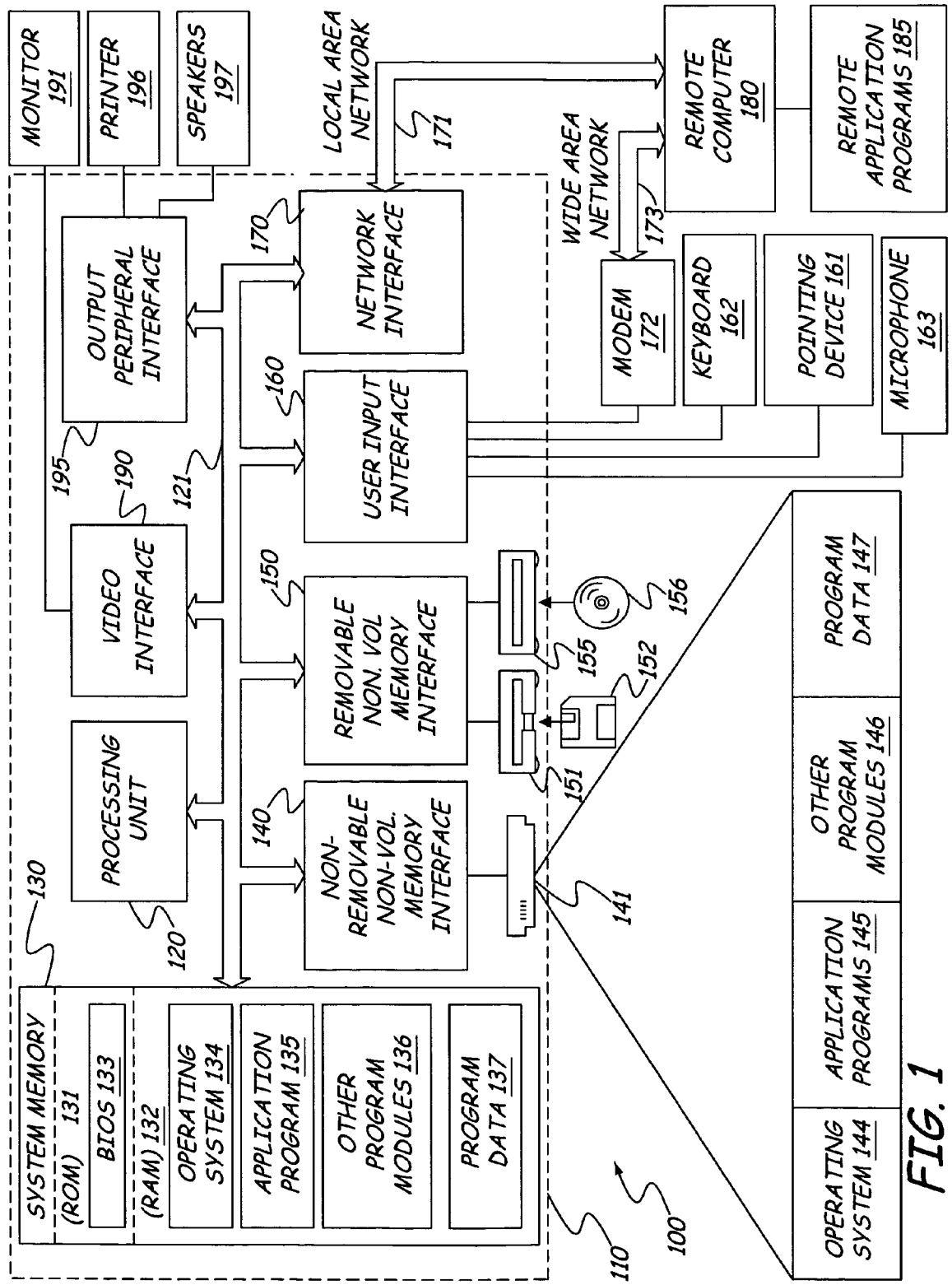
FIG. 1 is a block diagram of a general computing environment in which disclosed concepts can be practiced.

The disclosed methods, apparatus and systems can be embodied in a variety of computing environments, including personal computers, server computers, etc. Frequently, the methods apparatus and systems are embodied in a business application development environment, an application deployment environment, one or more business intelligence servers, etc. Before describing the embodiments in greater detail, a discussion of an example computing environment in which the embodiments can be implemented may be useful. FIG. 1 illustrates one such computing environment which can represent any of these different types of computing environments.

FIG. 1 illustrates an example of a suitable computing system environment 100 on which one or more aspects of the illustrated embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
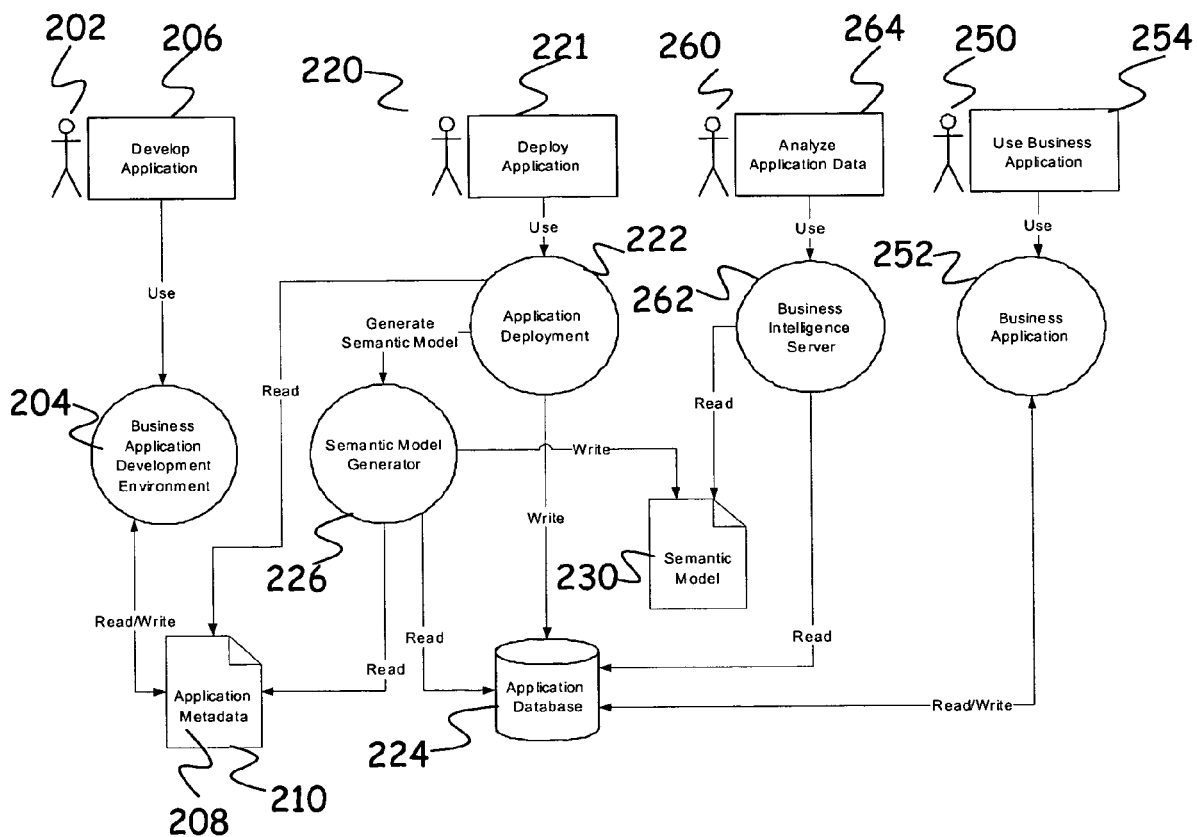
FIG. 2 is a diagram illustrating aspects of disclosed embodiments.
Figure 3:
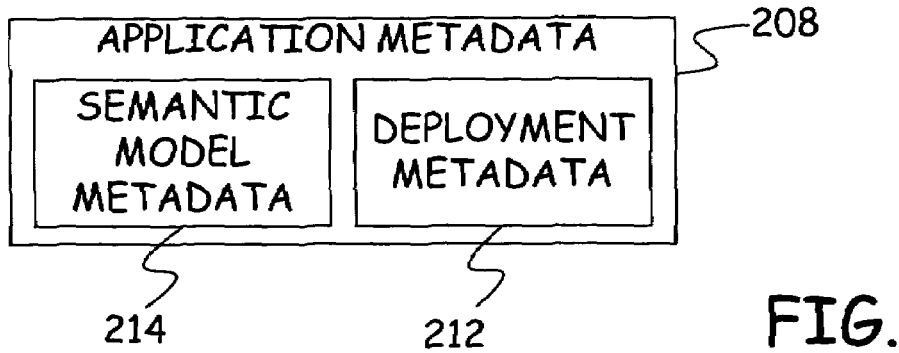
FIG. 3 is a block diagram illustrating aspects of application metadata.

Referring now to FIG. 2, shown is a diagrammatic illustration of aspects of disclosed embodiments of an integrated business application development system and method. As represented in FIG. 2, an application developer 202 uses a business application development environment 204 to develop the business application. This process is represented in FIG. 2 at block 206. In developing the business application, the developer defines application metadata 208 that describes the system. In FIG. 2, metadata 208 is represented as being stored in a metadata store 210. This metadata 208 includes both the minimum level of metadata needed to define the application (for example referred to as deployment metadata 212 shown in FIG. 3), and any additional metadata needed to generate the semantic model for the application (for example referred to as semantic model metadata 214 shown in FIG. 3). Conventionally, application metadata 208 would only include deployment metadata 212. At least significant portions of semantic model metadata 214 has conventionally been authored after deployment, as a secondary effort to build a semantic model. While semantic model metadata 214 is shown separately from deployment metadata 212 for illustrative purposes, those of skill in the art will recognize that much of metadata 208 can serve as both application metadata and deployment metadata. Creation or authoring of the application metadata 208, including both deployment metadata 212 and semantic model metadata 214, is described below in greater detail.

After creation of metadata 208 during the development process, a user 220 (who may or may not be the same person(s) as developer 202) can utilize an application deployment system or component 222 to deploy the application. This process is represented in FIG. 2 at block 221. Application deployment component 222 can be a separate deployment software system, or it can be a deployment program or module bundled with application metadata 208, for example. To deploy the application, the deployment component reads the application metadata 208 and uses this data to write a definition for the business application to application database 224.

After or concurrently with deployment of the business application, a semantic model generator component 226 generates a business intelligence semantic model 230 using the application metadata 208. In some embodiments, generation of semantic model 230 by semantic model generator 226 occurs automatically in response to deployment, though it can occur in response to a separate command from user 220. It can also occur as the result of developer 202 or user 220 creating and/or modifying application metadata. In either case, the semantic model is generated using metadata 208 without a separate development process. Typically, generation of semantic model 230 is carried out by component 222 also using application database 224.

After deployment of the application 252 (for example via creation or population of application database 224), a user 250 can utilize the business application, in the process reading and writing to application database 224. Use of the business application is represented in FIG. 2 at block 254. Another user can analyze application data (process represented at block 264 in FIG. 2) using a business intelligence server 262 and semantic model 230. If desired, semantic model 230 can also be synchronized to multiple business intelligence servers using the same semantic model generating process. One example of synchronizing a semantic model 230 to different business intelligence servers includes creating substantially identical copies to the different servers, all in response to deployment of the business application.

In various embodiments, application metadata 208, and potentially the resulting semantic model 230, can have features as described below. For example, when the business application supports multiple languages, the parts of the application metadata 208 that contain language specific text strings are defined for every supported language. Examples of other metadata which can be defined during the application development process to aid in the semantic model generation include data, labels or logic specifying:

Which of the fields on a table are the "title" fields for that table?

Does it make sense to group on this field?

Should this table be treated like a lookup and "flattened" into tables that refer to it?

How prominently should this table be shown in business intelligence applications?

What is the meaning of a currency amount field (i.e., is it in the company master currency, in the company secondary currency or is the currency of each record found by looking up another field)?

What business intelligence categories (a.k.a. perspectives) should a table or field appear in?

What is the order or magnitude of the typical number of rows to expect in a table?

As described above, once the application developer 202 has used the business application development environment 204 to define the application metadata 208, the user 220 responsible for deploying the system can then do so at the customer site. The component 222 of the business application infrastructure that provides this deployment facility not only reads the application metadata 208 and writes the definition of the application to the application database 224, but it also uses the semantic model generator 226 to read that same metadata and write the semantic model 230.

When creating the semantic model 230, the semantic model generator 226 uses heuristics about what various settings in the application metadata actually mean to end users that will want to perform analysis on the application data. For example, tables marked as system tables and temporary tables by default are excluded from the semantic model. Also certain classes of tables that are typically used to store parameters are also excluded by default. It also optionally examines the current data in the application database, that will be able to be used by business users to perform efficient business analysis. This is particularly useful in making the quality of the semantic model automatically improve over time as customizations are made and the business application is redeployed.

In various alternative embodiments, other things that the semantic model generator 226 can do automatically include:

Include a company "entity" in the semantic model. This company construct allows the selection of which of multiple companies to include information for in a report or other business intelligence analysis activity.

Multiple entities are automatically created for logical dimensions in the business application definition.

Programming constructs like enumerations are made available in the semantic model. An "enumeration" is an association of numeric values to strings. For example, 0=no, 1=yes. These can be included in the semantic model so that when a user wants to analyze data for a particular response (for example a yes or no response), they can chose yes and not have to chose zero.

Appropriate types of aggregations can be made available in the semantic model based on data type, and other metadata in the application definition. Thus, it can be made certain that only aggregations (e.g., sums, maximums, minimums, etc.) that are appropriate for a particular data type are exposed through the semantic model. Those that aren't appropriate are not exposed.

The correct identifying fields (attributes) are defined for each entity in the semantic model.

Each entity can be made visible in the categories (perspectives) to which it has been associated.

Figure 4:
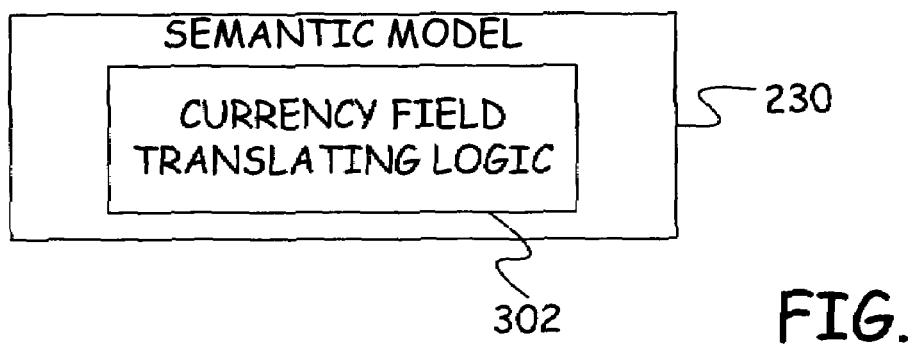
FIG. 4 is a block diagram illustrating aspects of a semantic model.

Other features can also be included in the methods, apparatus and systems of disclosed embodiments. For example, since currency fields are known in the development environment, in disclosed embodiments the metadata is created such that when the semantic model 230 is generated automatically in response to the application deployment, the currency fields are automatically handled to ensure correctly translated currency amount totals are available in the semantic model, without any additional work for the developer. Typically in current practice, this would require data transformation to take place to support currency translation, and/or an intimate understanding of the application schema by the semantic model developer, to achieve this same result. This inclusion of metadata which results in currency field translating logic 302 being included in semantic model 230 is represented in FIG. 4. Using this logic 302, when two currency values and are in different currencies, then one of them is automatically converted so that it can be consistent with the other one.

Figure 5:
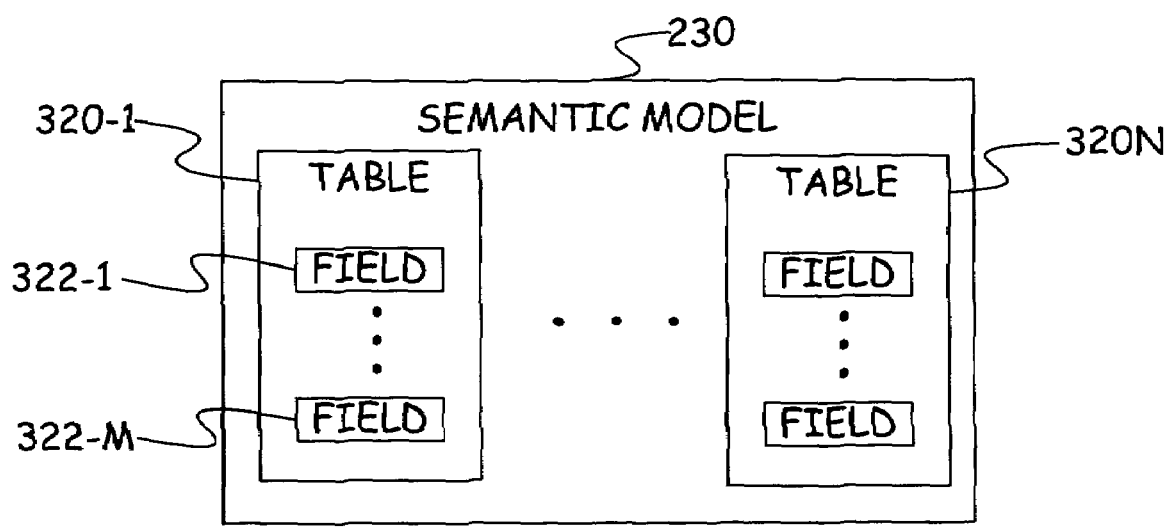
FIG. 5 is a block diagram illustrating aspects of a semantic model.

FIG. 5 is a diagrammatic illustration of semantic model 230 including multiple tables 320-1 through 320-N, which each table including one or more fields (for example fields 320-1 through 320-M shown in table 320-1). In some embodiments, tables and fields that contain no data are optionally automatically removed from the semantic model at the time it is generated or deployed. As is frequently the case in conventional methodology, semantic models that ship with business applications will include many fields that any given customer does not use, and that create needless clutter. In contrast, in some disclosed embodiments, the semantic model generation process includes a query of all tables and fields to determine if there is any data in them. If there is no data in the tables or fields, or if only null or zero data values are present, they can be hidden in the end user tools.

Figure 6:
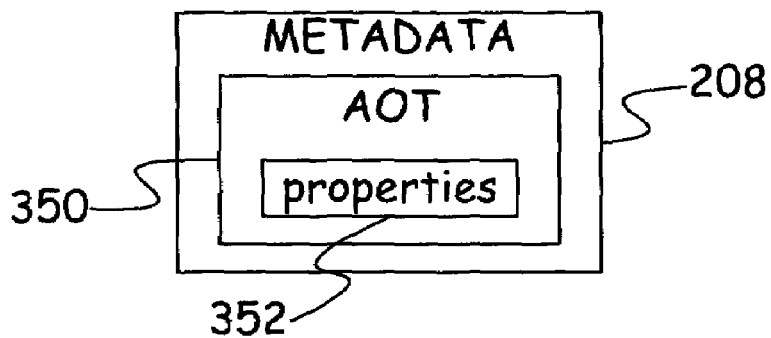
FIG. 6 is a block diagram illustrating aspects meta data.

In another aspect of disclosed embodiments, control over the content of semantic model is integrated with the main development environment user interface:

Simple properties (represented in FIG. 6 as reference 352) in the application object tree (AOT represented in FIG. 6 as reference 350) control which tables and fields will be shown, and how prominently, when users interact with the semantic model. An AOT holds all objects in an application. The application can in turn contain tools for development or modification. It is not necessary that the application contain tools for development. More important is that a single development environment (e.g., the AOT) can be used to provide the ability to control how the semantic model appears. The structure of an AOT is a tree hierarchy with a number of nodes that can be clicked to branch to different levels of nesting.

Whenever a table, field or any element subject to be included in the semantic model is defined, the AOT checks if the application developer 202 has made the correct use of the simple properties though the Best Practice Verification mechanism, encouraging from the beginning of the application development process to have meaningful metadata so a clean and useful model can be generated at any time.

Developers can define perspectives (a subset of the entire application schema.) in the AOT that meaningful subsets of users interact with when they create reports and analyses (and the development environment can check whether every table that should be in such a perspective is in fact in one). For example, if a particular table has been marked as being an important table, it can thereby be ensured that the table is included in the semantic model.

Custom views created in the development environment can optionally result in new "Entities" in the semantic model.

Application metadata that is not available in the business application database 224 (shown in FIG. 2) is automatically utilized in the model definition, improving the quality of the overall model.

Typically, in current practices, capabilities such as these are not available in the core application development environment, and either a new development environment must be made available that can understand the business application specific metadata, and/or developers must rely on the limited metadata available through the underlying application database 224 to attempt to achieve the same results.

In accordance with another aspect, sensible heuristics are used to default the visibility of tables and fields for which the semantic model-specific properties have not been explicitly set, based on the understanding of the rest of the business application metadata. As is typical in conventional methods, no such heuristics are possible, because the business application metadata is in a proprietary format, or is otherwise unavailable at the time that semantic models are being created.

As described previously, in accordance with another aspect, deployment of an application definition to the application or system database also optionally synchronizes the semantic model to one or more identified business intelligence servers. As is typical in conventional methods, changes made to the application schema require a second set of changes to the semantic model(s) to be manually made, and updated on the business intelligence servers. In accordance with the disclosed embodiments, multiple semantic models on multiple business intelligence servers can be synchronized by automatically regenerating the semantic models to the servers in response to redeployment of the business application.

In accordance with another aspect, multiple languages are automatically supported by leveraging the existing localized application metadata. In other words, semantic model 230 can be made language aware, such that if the operating system of a user performing analysis via the semantic model is in a particular language, then the semantic model can automatically detect this and present tags and other information in that particular language. In contrast, as is typical in conventional methods, a separate semantic model must generally be manually created for each desired language.

In accordance with another aspect, identifiers used in the semantic model are kept consistent between versions of a model. For example, a customer entity that has a particular identification (ID) does not have that ID change when the model is refreshed during a subsequent deployment. This ensures that business analysis views created against a semantic model will continue to work between iterations of a model. In contrast, as is typical in conventional methods, either such IDs do not exist, or because of the way the model is authored directly on the business intelligence server, there is no need to perform special ID-persisting logic.

Figure 7:
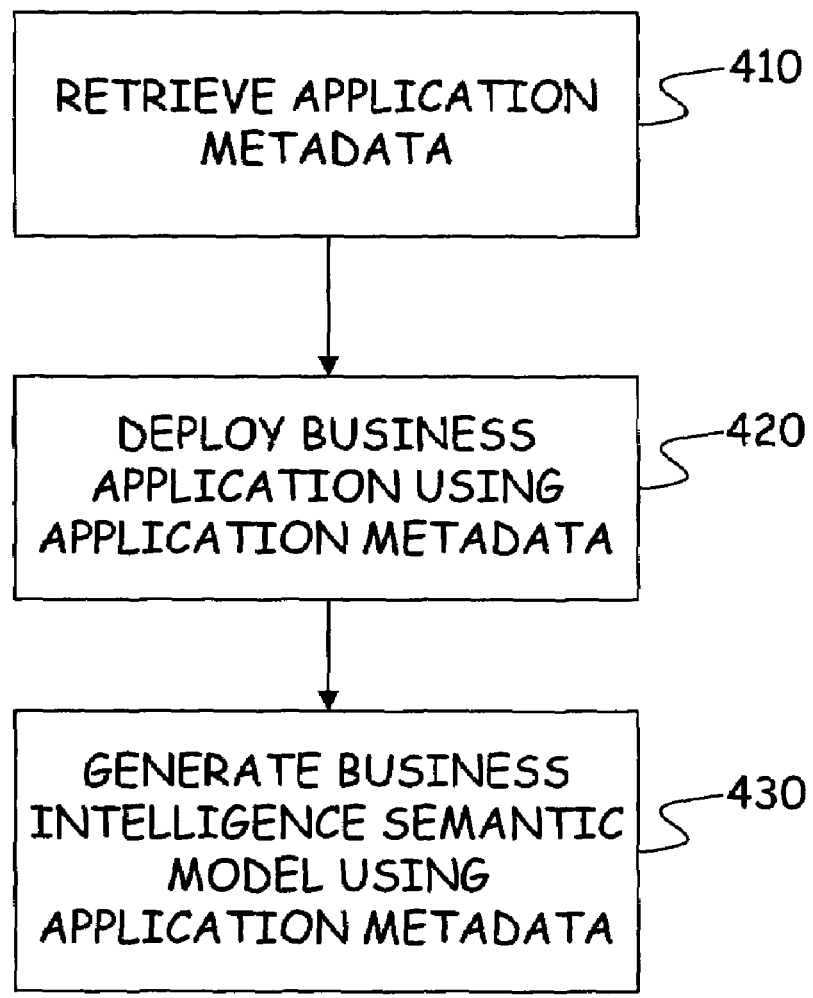

Referring now to FIG. 7, shown is a flow diagram illustrating a method of deploying a business application and generating a business intelligence semantic model corresponding to the business application, in accordance with the above description. As shown at block 410, the method includes the step of retrieving application metadata 208. In this step, the application metadata has already been created, and is retrieved from metadata store 210 shown in FIG. 2. Next, as shown at block 420, the method includes the step of deploying the business application using the application metadata. As was described previously, deploying the business application comprises using the application metadata to write a definition of the business application to an application database 224. Then, as is illustrated at block 430, the method includes automatically generating the business intelligence semantic model using the application metadata 208. This is performed using semantic model generator 226. In one more particular embodiment, the step 430 further comprises automatically generating the business intelligence semantic model using both the application metadata 208 and the application database 224.

Figure 8:
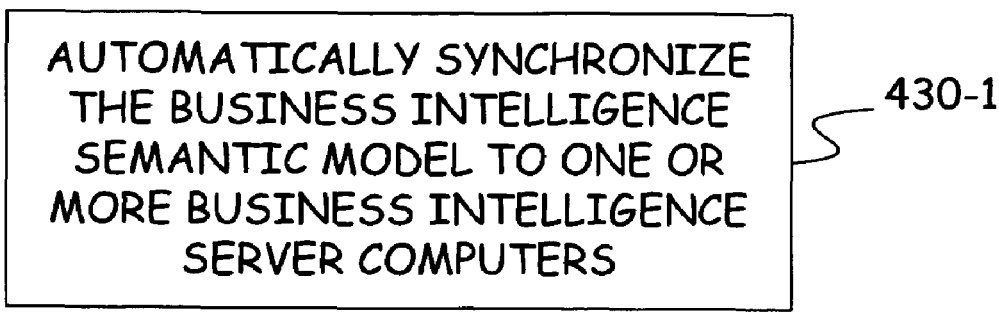

In one more particular embodiment illustrated in block 430-1 of FIG. 8, the step 430 from FIG. 7 further comprises automatically synchronizing the semantic model to at least one business intelligence server computer.

Figure 9:
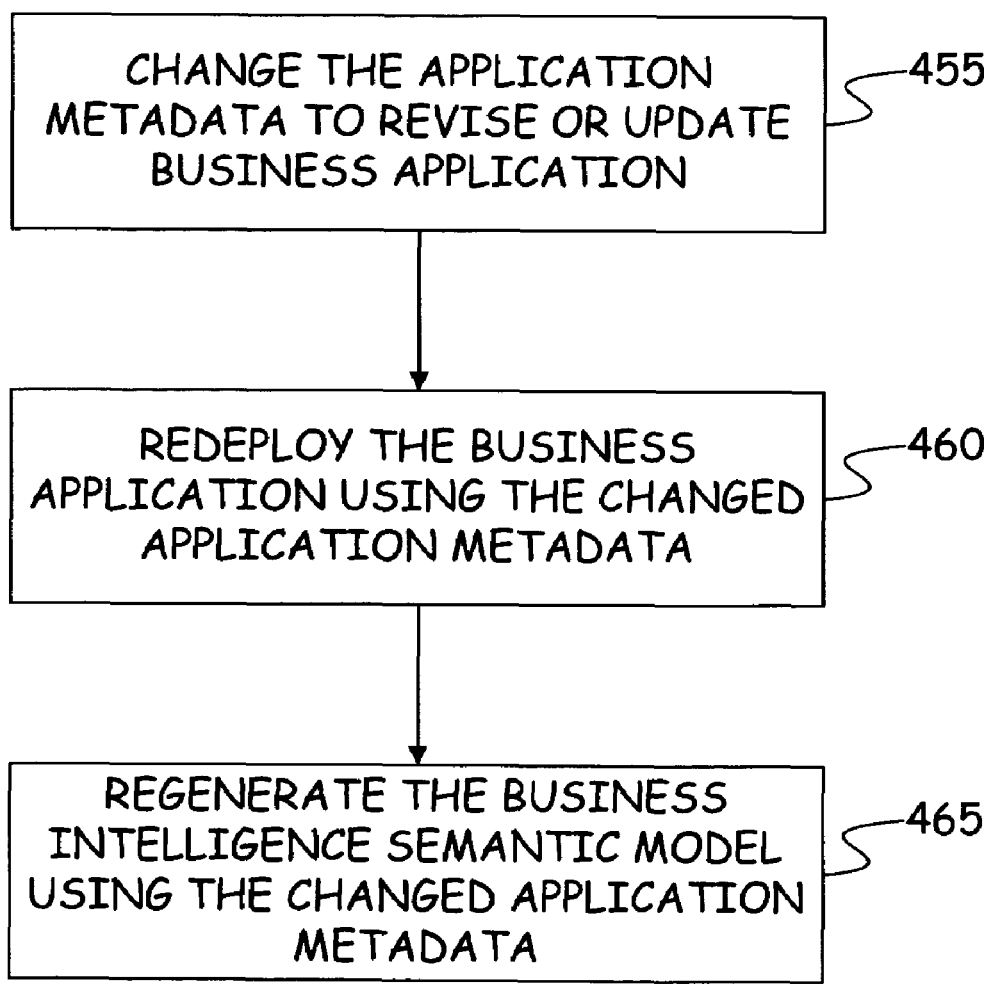

Referring now to FIG. 9, in some embodiments the method of FIG. 7 includes the further steps illustrated in blocks 455, 460 and 465. These steps typically occur at a later time during revision, updating or other change of the application metadata, and thereby the business application. This is reflected in the step shown at block 455, which includes changing the application metadata 208 to revise the business application. Then, in the step shown at block 460, the business application is redeployed by using the changed application metadata to write a new definition of the business application to an application database. This can again be application database 224 shown in FIG. 2, or a new application database. In some embodiments, however, in the case of an existing database, redeployment is not necessary. Step 455 directly modifies the application metadata. Finally, as shown at block 465, the method includes automatically regenerating the business intelligence semantic model using the changed application metadata.

In other more particular embodiments of the method illustrated in FIG. 7, prior the step of retrieving application metadata shown at block 410, the method includes the step of creating the application metadata such that it includes both metadata for deploying the business application and metadata for generating the business intelligence semantic model. This can be as described above, and is illustrated in block 405 of FIG. 10. As is shown in FIG. 2, the application metadata can be created using an application development environment.

An application development environment is any application that allows the manipulation of application metadata or application constructs that manipulate that metadata (source code). The application development environment provides a developer a set of tools to create from scratch a new business application, extend an existing one with new functionality, or to customize it according with a very specific business need. The application environment can include among other tools:

Data Dictionary: Supports the creation of tables, fields, indexes and relationships between tables to create the underlying data schema for the application. Also provides additional constructs to simplify the creation of the data schema encouraging reutilization and keeping the consistency of the information trough like user types definitions, enumerations, views and maps.

Class Browser, Editor, Compiler, Debugger and Test Frameworks for the creation of application business logic, correctness verification, and translation to native code for later execution.

User Interface and Report Designers, Tools and Wizard for the easy creation of User Interface and Reports elements including Menus, Forms, Web Pages, Reports, Resources, defining the navigation between those elements, and control the order to present the information and features to application users.

Development, System Configuration, and Deployment Documentation.

As described previously, in other more particular embodiments, step 405 further comprises controlling content of the semantic model 230 by setting properties (352 shown in FIG. 6) of an application object tree 350 to control which tables and fields (for example tables 320 and fields 322 shown in FIG. 5) are to be shown when a user interacts with the business intelligence semantic model. This is illustrated in block 405-1 shown in FIG. 11.

Referring now to FIG. 12, shown is a more particular embodiment of step 405 shown in 10. In this more particular embodiment, shown at block 405-2, the step of creating the application metadata further comprises including currency field translating logic in the metadata such that, in the generated business intelligence semantic model, currency values in different currencies are automatically converted to a single currency. This currency field translating logic is illustrated at block 302 in semantic model 230 shown in FIG. 4, which will have corresponding currency field translating logic in the metadata.

Figure 13:
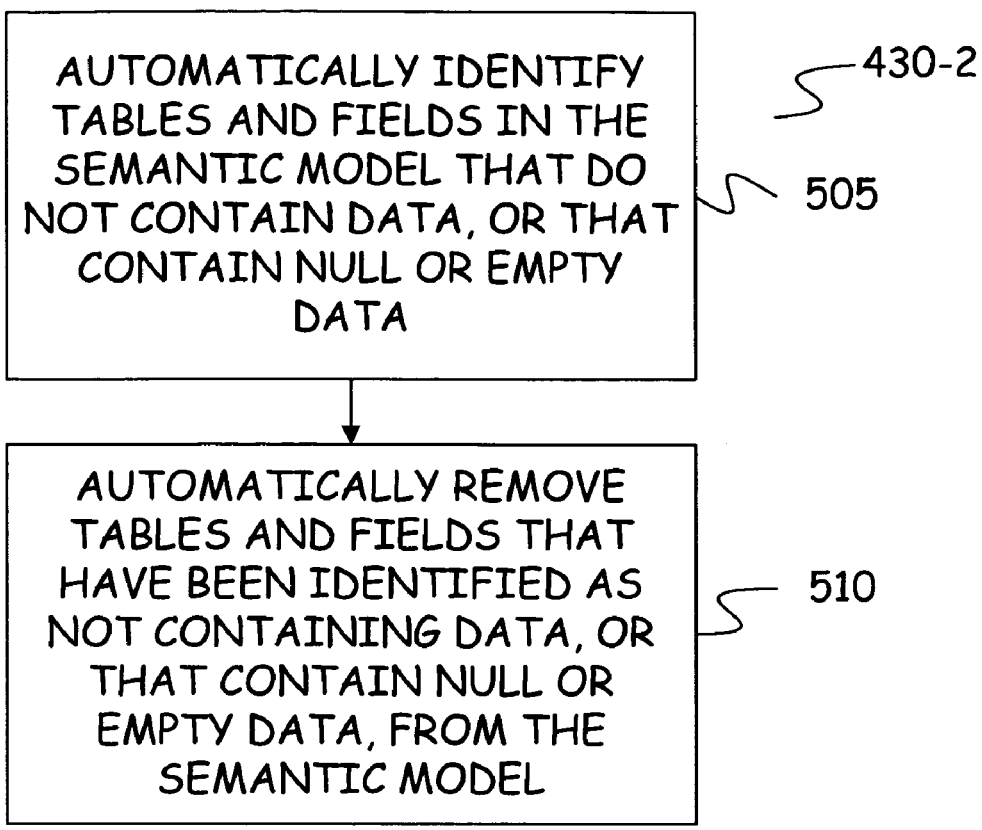

In still other more particular method embodiments described previously and illustrated in at 430-2 in FIG. 13, the step 430 of automatically generating the business intelligence semantic model further comprises the steps shown at blocks 505 and 510. As shown at block 505, this includes automatically identifying tables and fields in the semantic model that do not contain data, null data or empty data. As shown at block 510, this also includes automatically removing the tables and fields from the semantic model that have been identified as not containing data, as containing null data, or as containing empty data. Those of skill in the art will recognize that the steps shown at blocks 505 and 510 can be implemented by identifying tables and fields that contain non-null or non-empty data, and then automatically removing the other fields (i.e., the fields which haven't been identified as containing non-null or non-empty data).

Figure 14:
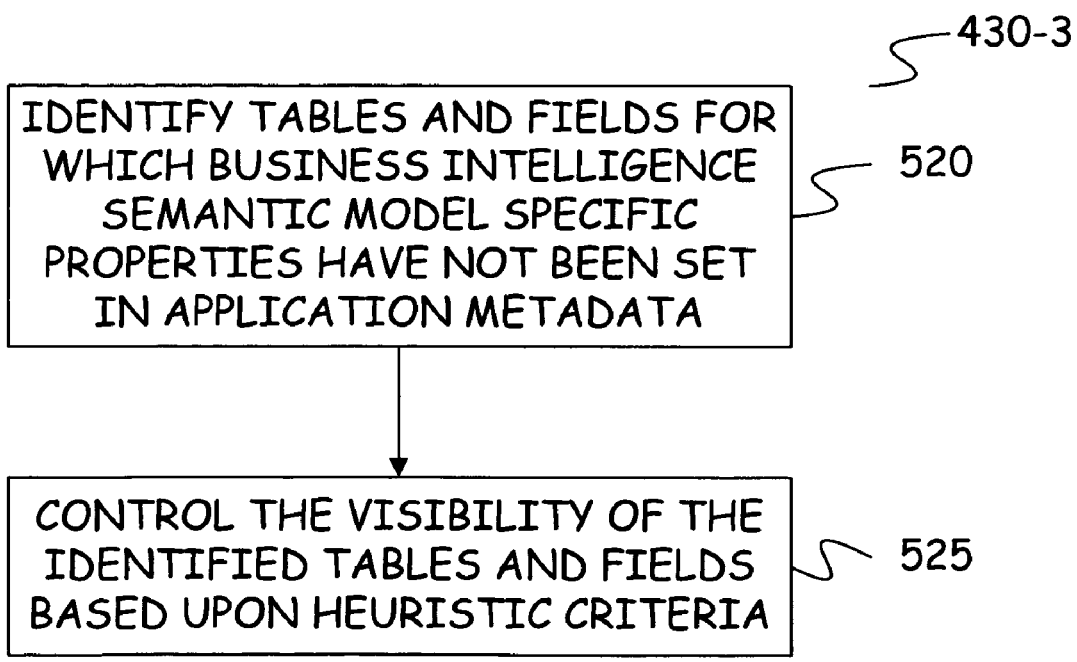

Referring now to FIG. 14, shown is yet another more particular embodiment described previously. As illustrated at 430-3 shown in FIG. 14, the step 430 of automatically generating the business intelligence semantic model further comprises the steps shown at blocks 520 and 525. As shown at block 520, this includes identifying tables and fields for which business intelligence semantic model specific properties have not been set in the application metadata. As shown at block 525, this also includes the step of controlling the visibility of the identified tables and fields based upon heuristic criteria.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of deploying a business application and generating a business intelligence semantic model corresponding to the business application, the method comprising:

creating application metadata, the application metadata includes both metadata for deploying the business application and metadata for generating the business intelligence semantic model, wherein the creating the application metadata further comprises including currency field translating logic in the application metadata such that in the generated business intelligence semantic model, currency values in different currencies are automatically converted to a single currency;

retrieving the application metadata by using a computer that includes a processor, wherein the application metadata is stored in a memory;

deploying the business application, wherein deploying the business application comprises using the application metadata to write a definition of the business application to an application database;

automatically generating the business intelligence semantic model by using a semantic model generator, using the application metadata and the application database, in response to the deployment of the business application, wherein the automatically generating the business intelligence semantic model further comprises:

automatically identifying tables and fields in a semantic model that do not contain data, that contain null data, or that contain empty data, and automatically removing the tables and fields from the semantic model that have been identified as not containing data, as containing null data or as containing empty data;

changing the application metadata to revise the business application;

redeploying the business application, wherein redeploying the business application comprises using the changed application metadata to write a new definition of the business application to the application database; and automatically regenerating the business intelligence semantic model using the changed application metadata.

2. The method of claim 1, wherein using the semantic model generator to automatically generate the business intelligence semantic model in response to deployment of the business application farther comprises:

automatically synchronizing the semantic model to at least one business intelligence sewer computer.

3. The method of claim 1, wherein automatically generating the business intelligence semantic model further comprises:

using the semantic model generator to automatically generate a plurality of language specific semantic models in different languages in response to deployment of the business application.

4. The method of claim 1, wherein creating the application metadata further comprises:

controlling content of the semantic model by setting properties of an application object tree to control tables and fields which are shown when a user interacts with the business intelligence semantic model.

5. The method of claim 1, wherein automatically generating the business intelligence semantic model further comprises:

identifying tables and fields for which business intelligence semantic model specific properties have not been set in the application metadata; and controlling visibility of the identified tables and fields based upon heuristic criteria.

6. An integrated business application development and deployment system, the system comprising:

a computer that includes a processor;

a metadata store memory storing application metadata, the application metadata including both metadata for deploying the business application and metadata for generating a business intelligence semantic model;

an application deployment component for using the application metadata to write a definition for a business application to an application database; and a semantic model generating component for automatically generating the business intelligence semantic model, using the application metadata, in response to the application deployment component writing the definition for the business application to the application database, wherein the semantic model generating component generates the business intelligence semantic model using the application metadata such that the business intelligence semantic model includes currency field translating logic such that currency values in different currencies are automatically converted to a single currency, wherein the semantic model generating component further automatically generates the business intelligence semantic model by:

automatically identifying tables and fields in a semantic model that do not contain data, that contain null data, or that contain empty data, and automatically removing the tables and fields from the semantic model that have been identified as not containing data, as containing null data or as containing empty data;

receiving changed application metadata to revise the business application;

redeploying the business application, wherein redeploying the business application comprises using the changed application metadata to write a new definition of the business application to the application database; and automatically regenerating the business intelligence semantic model using the changed application metadata.

7. The system of claim 6, wherein the application metadata further comprises an application object tree, and wherein properties of the application object tree control tables and fields which are shown when a user interacts with the business intelligence semantic model.

8. The system of claim 6, and further comprising at least one business intelligence server, the semantic model generating component being further configured to automatically synchronizing the semantic model to the at least one business intelligence server.

* * * * *

UNITED STATES PATENT AND TRADEMARK OFFICE
CERTIFICATE OF CORRECTION

PATENT NO. : 7,505,991 B2  
APPLICATION NO. : 11/197141  
DATED : March 17, 2009  
INVENTOR(S) : Davin J. Fifield et al.

Page 1 of 1

It is certified that error appears in the above-identified patent and that said Letters Patent is hereby corrected as shown below:

In column 12, line 8, in Claim 2, delete "farther" and insert -- further --, therefor.

In column 12, line 10, in Claim 2, delete "sewer" and insert -- server --, therefor.

Signed and Sealed this  
Third Day of May, 2011

David J. Kappos  
*Director of the United States Patent and Trademark Office*